United States Patent [19]

Okamoto et al.

[11] Patent Number: 5,561,266

[45] Date of Patent: Oct. 1, 1996

[54] CABLE CONNECTOR

[75] Inventors: Hiroyuki Okamoto; Hiromi Masuda; Masakazu Umemura; Kouji Koike; Tetsurou Muramatsu, all of Shizuoka-ken, Japan

[73] Assignee: Yazaki Corporation, Tokyo, Japan

[21] Appl. No.: 300,923

[22] Filed: Sep. 6, 1994

[30] Foreign Application Priority Data

Sep. 6, 1993 [JP] Japan .................................. 5-221151

[51] Int. Cl.⁶ ........................................................ H01R 4/02
[52] U.S. Cl. ........................ 174/72 R; 174/84 R; 174/88 R
[58] Field of Search ................................ 174/84 R, 88 R, 174/72 TR, 72 R, 72 C, 71 R; 29/868, 872; 439/492, 493

[56] References Cited

U.S. PATENT DOCUMENTS

| | | |
|---|---|---|
| 1,290,153 | 1/1919 | Fitzpatrick . |
| 2,963,392 | 12/1960 | Dahlgren . |
| 3,155,809 | 11/1964 | Griswold .................... 219/86 |
| 3,715,457 | 2/1973 | Teagno et al. ................ 174/88 R |
| 4,319,075 | 3/1982 | Willette ........................ 174/117 FF |
| 4,868,637 | 9/1989 | Clements et al. ............. 174/88 R |
| 4,963,699 | 10/1990 | Urushibata et al. .......... 174/88 R |
| 5,045,641 | 9/1991 | Urushibata et al. .......... 174/74 R |
| 5,057,650 | 10/1991 | Urushibata et al. .......... 174/88 R |
| 5,231,758 | 8/1993 | Schauer . |
| 5,281,765 | 1/1994 | Iura et al. ..................... 174/117 F |

FOREIGN PATENT DOCUMENTS

| | | |
|---|---|---|
| 0465173A1 | 1/1992 | European Pat. Off. . |
| 63-58486 | 4/1988 | Japan . |
| 5-54920 | 3/1993 | Japan . |

Primary Examiner—Kristine L. Kincaid
Assistant Examiner—Chau N. Nguyen
Attorney, Agent, or Firm—Wigman, Cohen Leitner & Myers, P.C.

[57] ABSTRACT

A cable connector for connecting cable conductors (6A) of a flat cable (6) to wire conductors (41A, 42A, 43A) of a plurality of external wires (41, 42, 43), respectively comprises a T-shaped wire mounting plate (30) formed with a plurality of U-shaped grooves (31, 32, 33) and with a pair of guide bridges (34, 35). The U-shaped grooves hold the external wires on a first surface thereof in such a way that the wire conductors of the external wires are arranged being bent at a right angle and further projected from one end surface of the wire mounting plate, respectively. A pair of the guide bridges (34, 35) hold the flat cable on a second surface thereof opposite to the first surface thereof in such a way that the cable conductors of the flat cable are arranged being projected from the same end surface of the wire mounting plate side by side with the projecting wire conductors of the external wires. After that, the wire conductors of the external wires are soldered to the cable conductors of the flat cable near the same end surface of the wire mounting plate. Further, it is preferable to mold the wire mounting plate with a resin together with the external wires and the flat cable both pressure-fit to the wire mounting plate. The flat cable connector can reduce the cable connection process without need of any jig, being strong against external force.

20 Claims, 7 Drawing Sheets

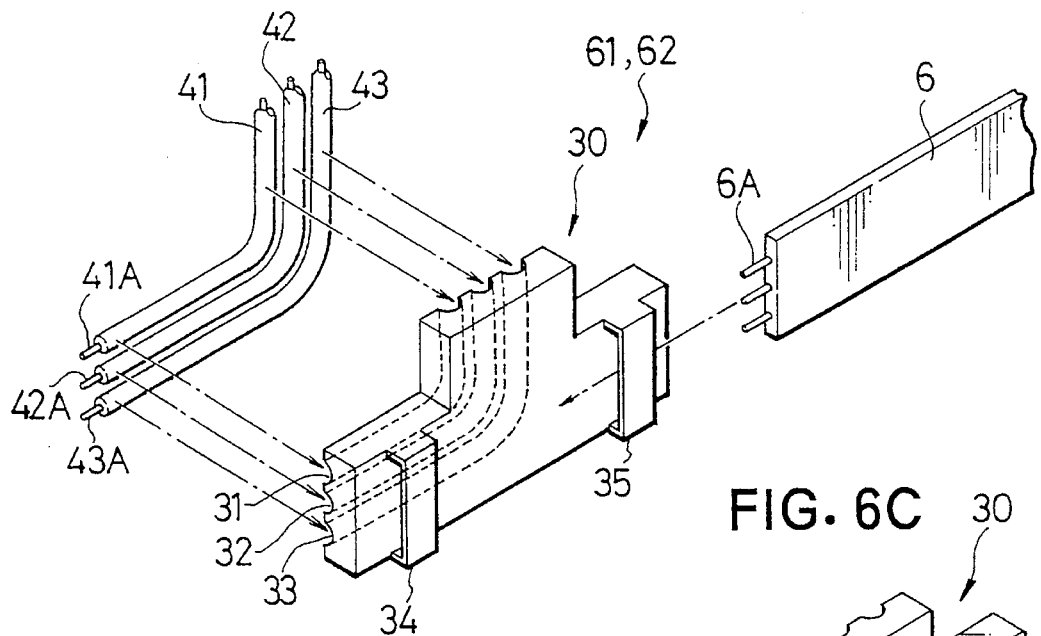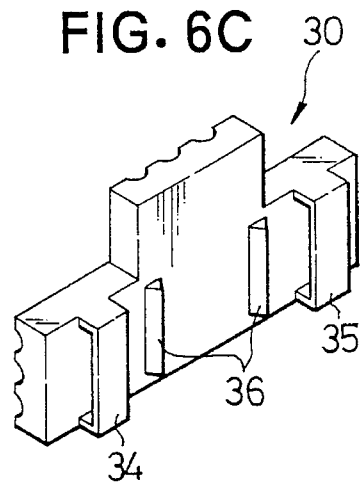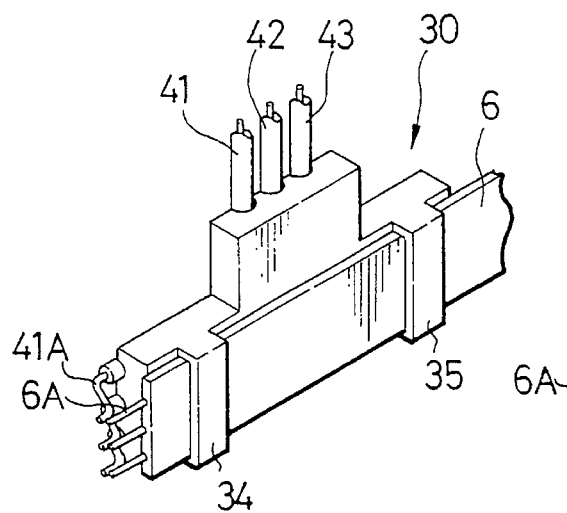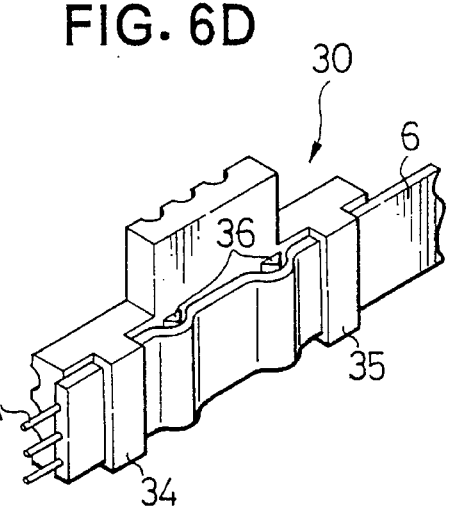

CABLE CONNECTOR

BACKGROUND OF THE INVENTION

1. Technical Field

The present invention relates to a cable connector for connecting cable conductors of a flat cable to wire conductors of external wires, and more specifically to a cable connector suitable for use with a brushless electric signal transmitting apparatus mounted in a steering column of an automotive vehicle, for instance to transmit a number of electric signals from a rotating steering handle shaft to a fixed steering column through the flat cable.

2. Description of the Related Art

Recently, with the advance of an electric control system for au automotive vehicle, a number of switches are required to be arranged on a steering handle (steering wheel) of an automotive vehicle for activating various electric control circuits, so that it is necessary to electrically connect these rotating switches to control circuits by wires through a rotary steering handle and a fixed steering column. Here, since the steering handle of the automotive vehicle is fixed to a rotary handle shaft rotatable both clockwise and counterclockwise by a few turns relative to the fixed steering column, a brushless electric signal transmitting apparatus is used to transmit a plurality of electric signals between the rotary handle shaft and the fixed steering column through a flexible flat cable (referred to as a flat cable, hereinafter) having a plurality of conductive cable wires therein. In this electric signal transmitting apparatus, the flat cable is disposed in an annular space formed between a rotary body fixed to the handle shaft side and a housing fixed to the steering column side under such a condition that the flat cable is wound into a vortex state or into a reversed vortex state (being returned midway of the flat cable).

In the above-mentioned brushless electric signal transmitting apparatus, it is necessary to connect wires extending from the switches arranged on the steering handle to cable conductors of an inner end of the flat cable and further to connect cable conductors of an outer end of the flat cable to wires extending to the control circuits, by use of appropriate flat cable connectors, respectively.

FIGS. 1(A) and 1(B) show a conventional cable connector 610 for connecting cable conductors 600A of a flat cable 600 to wire conductors 500A of the wires 500, which is disclosed in Japanese Published Unexamined (Kokai) Application No. 63-58486. In more detail, the cable connector 610 (used as both the inner and outer flat cable connectors) is composed of a connector body 610A and a cover (not shown). In this cable connector 610, an L-shaped internal recess 610B is formed in the connector body 610A,.

In connection by use of the cable connector 610, the wire conductors 500A of the wires 500 are first soldered to conductors 600A of the flat cable 600, and then bent at right angles along the L-shaped recess 610B of the connector body 610A to put the soldered wires 500 to the recess 610B of the connector body 610A, respectively. After that, the connector body 610A is covered with the cover (not shown).

However, the conventional cable connector 610 for connecting the wires 500 with the flat cable 600 involves the following problems:

(1) A jig is necessary to locate or temporarily fix the wire conductors 500A of the wires 500 relative to the conductors 600A of the flat cable 600, so that the conductor connecting work is complicated and needs a number of steps.

(2) After the wires 500 have been connected to the flat cable 600, since the connected wires 500 are bent along the recess 610B of the connector body 610A and further a cover must be attached to the connector body 610A, an internal stress is inevitably generated at the conductors 600A of the flat cable 600, so that there exists a problem in that the conductors 600A of the flat cable 600 are broken off at the worst.

(3) Even after the wires 500 have been soldered to the flat cable 600, when an tension is applied to the wires 500, since the applied tension cannot be received by the connector body 610A, a problem arises in that the conductors 600A of the flat cable 600 are cracked as shown by Z in FIG. 1(B) or broken off at the worst.

SUMMARY OF THE INVENTION

With these problems in mind, therefore, it is the object of the present invention to provide a cable connector suitable for use with a brushless electric signal transmitting apparatus, which can improve both the productivity and the reliability of connection between the flat cable and external wires.

To achieve the above-mentioned object, the present invention provides a cable connector for connecting cable conductors of a flat cable to wire conductors of a plurality of external wires, respectively, which comprises a wire mounting plate having: external wire holding means for holding the external wires on a first surface thereof in such a way that the wire conductors of the external wires are arranged being projected from one end surface of the wire mounting plate, respectively; and flat cable holding means for holding the flat cable on a second surface thereof opposite to the first surface thereof in such a way that the cable conductors of the flat cable are arranged being projected from the same end surface of the wire mounting plate, the wire conductors of the external wires being connected to the cable conductors of the flat cable, respectively near the same end surface of the wire mounting plate.

Here, the external wire holding means are preferably a plurality of U-shaped grooves formed on the first surface of said wire mounting plate, each external wire being pressure-fit into each groove. The grooves are formed being bent at a right angle on the first surface of said wire mounting plate.

Further, the flat wire holding means is preferably at least two square-shaped guide bridges formed being spaced from each other on the second surface of said wire mounting plate, the flat cable being pressure-passed through the two guide bridges. The flat wire holding means further comprises at least one projection formed on the second surface of said wire mounting plate to hold the flat cable more tightly in cooperation with the two guide bridges.

The wire conductors of the external wires are soldered to the cable conductors of the flat cable near the same end surface of the wire mounting plate. The wire mounting plate is of T-shape.

Further, it is preferable that wire mounting plate, the external wires and the flat cable are all molded together with a resin after having been assembled.

BRIEF DESCRIPTION OF THE DRAWINGS

FIG. 6(A) is a perspective view showing a first embodiment of the cable connector for connecting the flat cable and the wires;

FIG. 6(B) is a perspective view showing a connected status of first embodiment of the cable connector shown in FIG. 6(A);

FIG. 6(C) is a perspective view showing a modification of the first embodiment of the cable connector shown in FIG. 6(A);

FIG. 6(D) is a perspective view showing a connected status of the modification of the first embodiment of the cable connector shown in FIG. 6(C);

DETAILED DESCRIPTION OF THE EMBODIMENTS

Prior to the detailed description of the cable connector according to the present invention, the brushless electric signal transmitting apparatus will be described hereinbelow with reference to the attached drawings.

Figure 1A:
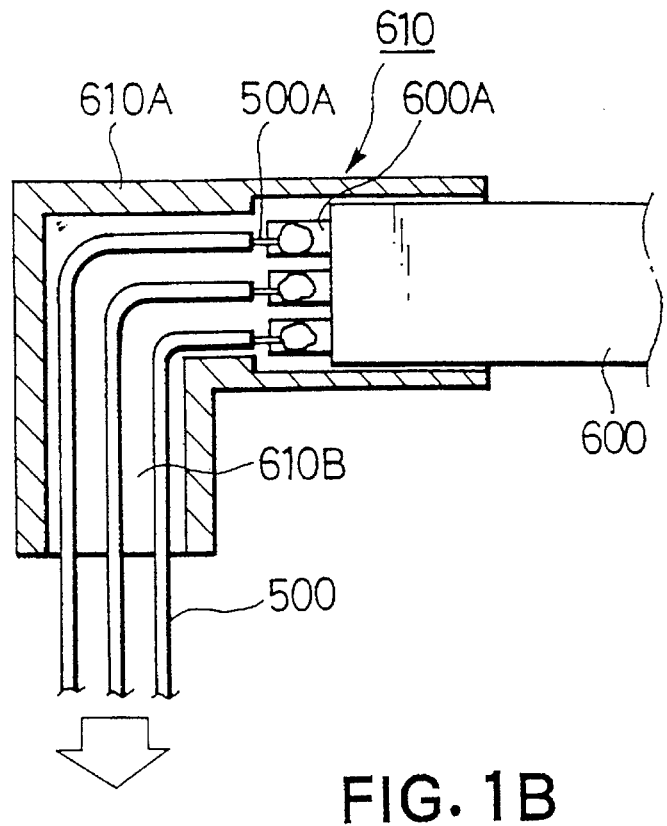
FIGS. 1(A) and (B) are enlarged views showing a related cable connector for connecting a flat cable to external wires, which is used with a general brushless electric signal transmitting apparatus.
Figure 1B:
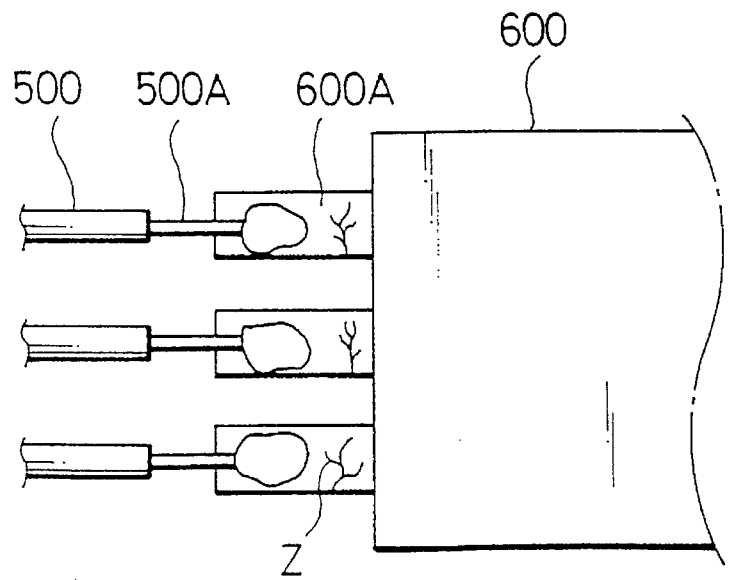
Figure 2:
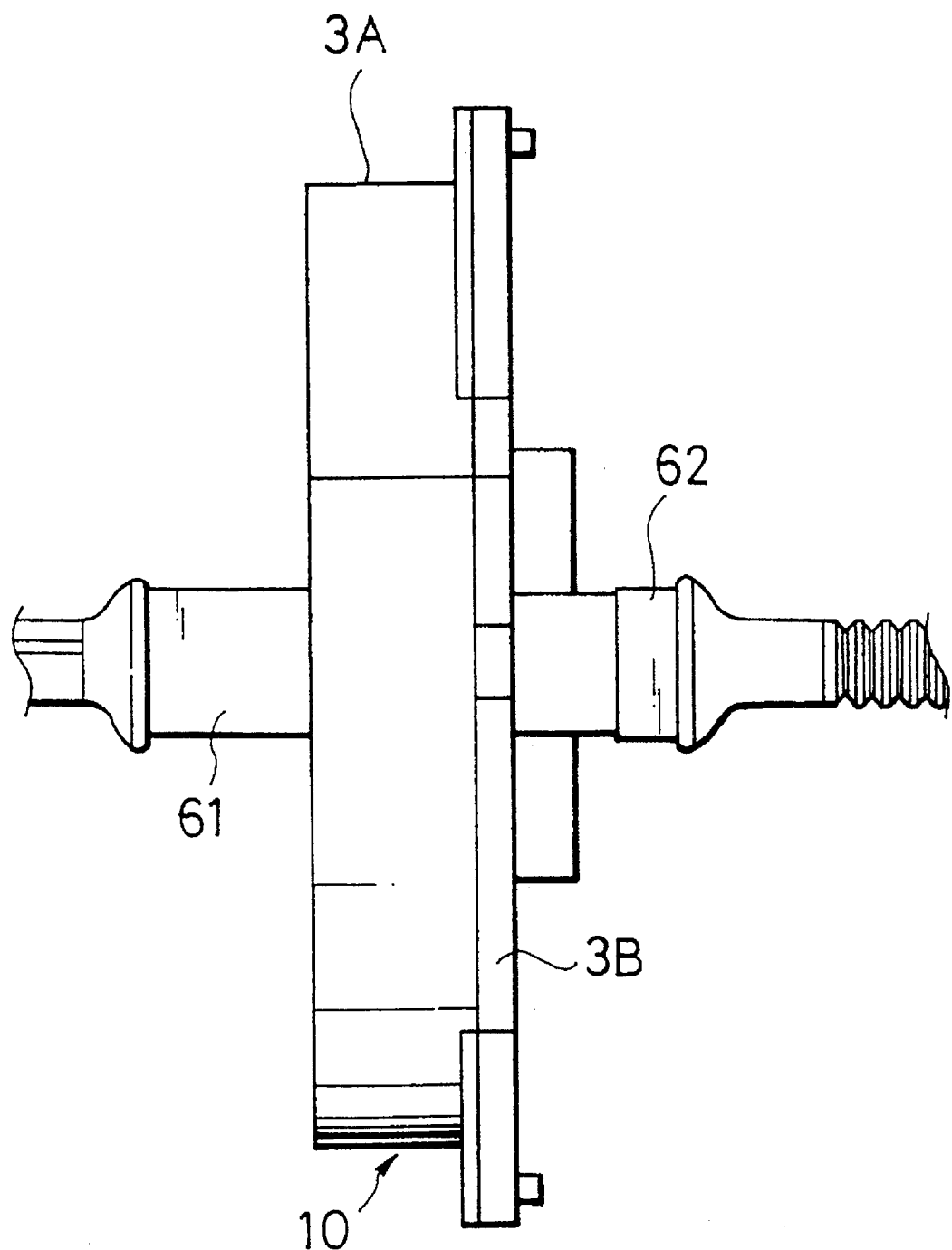
FIG. 2 is a side view showing a brushless electric signal transmitting apparatus including the cable connector according to the present invention.

FIG. 2 is a side view showing the brushless electric signal transmitting apparatus. In FIG. 2, the apparatus 10 is composed of an upper cover 3A, a lower cover 3B, and two inner and outer cable connectors 61 and 62. Although not shown, a housing for mounting the flat cable is disposed between the two upper and lower covers 3A and 3B.

Figure 3A:
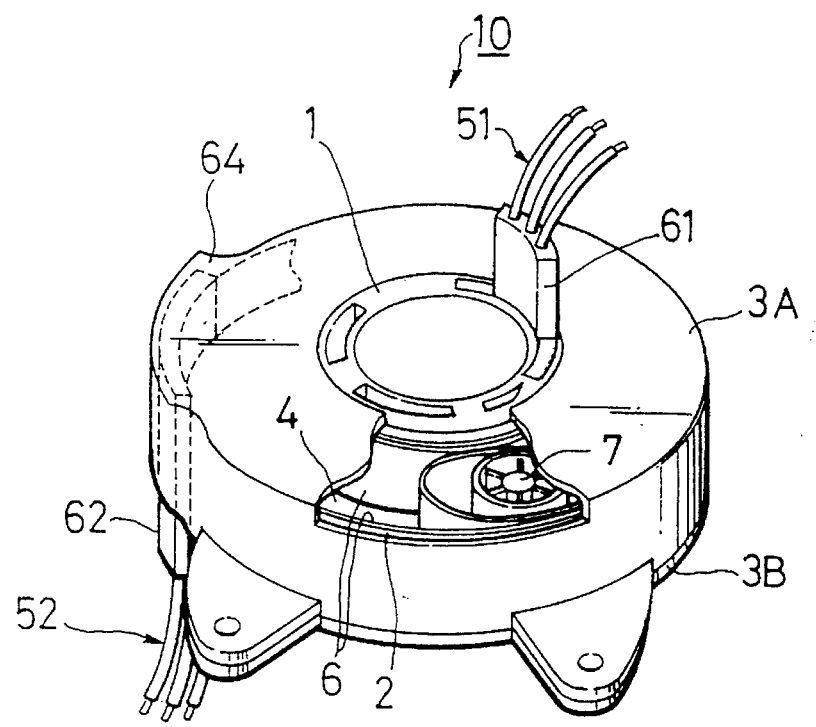
FIG. 3(A) is a perspective, partially broken view showing the same brushless electric signal transmitting apparatus shown in FIG. 2.
Figure 3B:
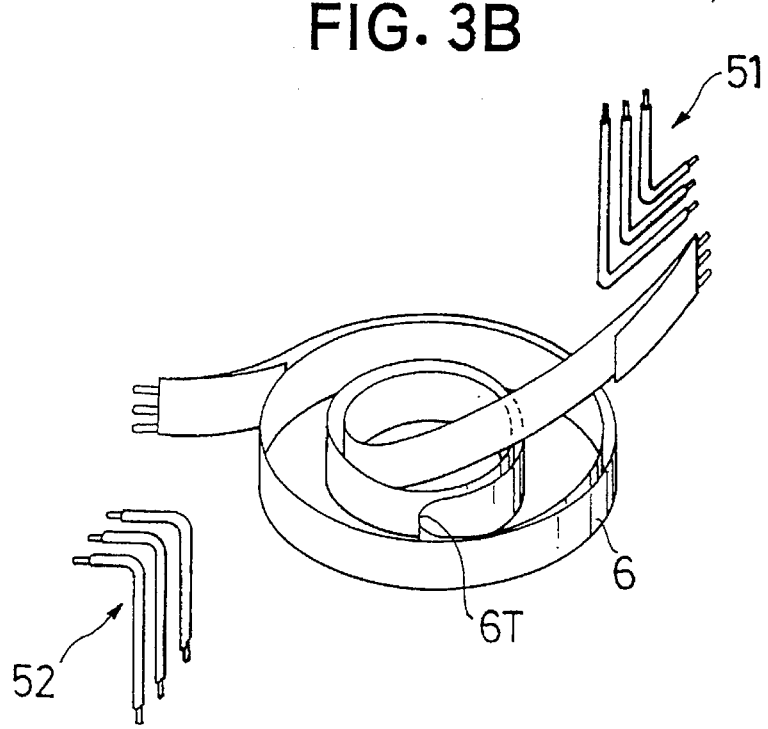
FIG. 3(B) is a perspective view showing the flat cable of the brushless signal transmitting apparatus shown in FIG. 2.

FIG. 3(A) is a perspective, partially broken view showing the same brushless electric signal transmitting apparatus shown in FIG. 2, and FIG. 3(B) is a perspective view showing the flat cable of the brushless signal transmitting apparatus shown in FIG. 2.

In FIG. 3(A), the apparatus 10 comprises a cylindrical rotary body 1 into which a steering shaft (not shown) is inserted, a housing 2 fixed to a steering column (not shown) to rotatably support the rotary body 1 between the upper cover 3A and the lower cover 3B. An annular space 4 is formed between the rotary body 1 and the housing 2. A flexible flat cable 6 is interposed in the formed annular space 4. A radially inner end thereof is fixed to the rotary body 1 and a radially outer end thereof fixed to the housing 2 in such a way as to be returned midway as depicted by 6T in FIG. 3(B). Further, a plurality (six in FIG. 4(A)) of guide rollers 7 are also arranged in the annular space 4.

In FIG. 3(A), an inner cable connector 61 is mounted at a radially inward end position of the apparatus 10 to connect the inner end of the flat cable 6 with external wires 51 extending to various switches (not shown) arranged on the steering handle side within the steering column. Further, an outer cable connector 62 is mounted at a radially outward position of the apparatus 10 to connect the outer end of the flat cable 6 with external wires 52 extending to various control circuits (not shown), within the steering column.

Figure 4A:
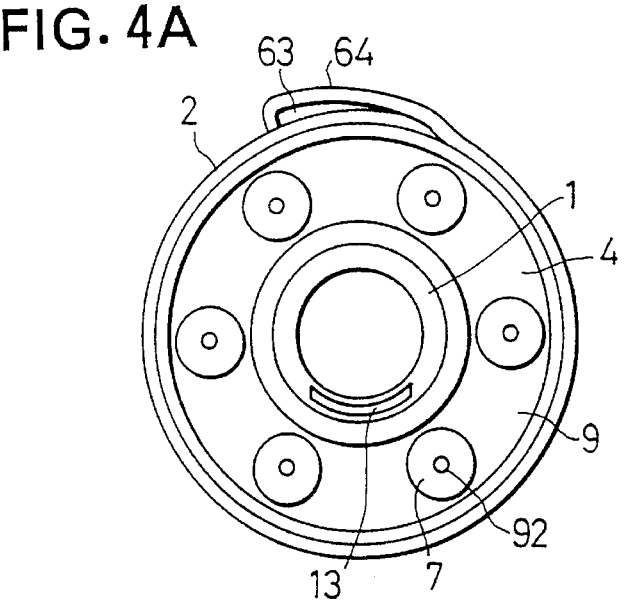
FIG. 4(A) is a plane view showing a rotary body and a housing for mounting the flat cable of the brushless electric signal/transmitting apparatus shown in FIG. 2.
Figure 4B:
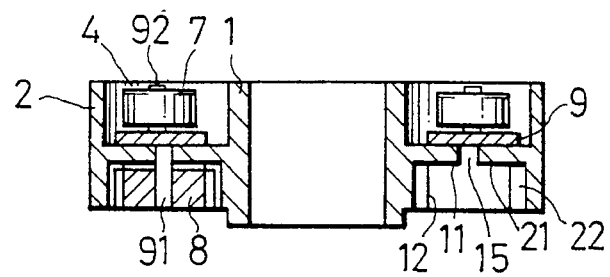
FIG. 4(B) is a cross-sectional view showing the brushless electric signal transmitting apparatus shown in FIG. 2.
Figure 4C:
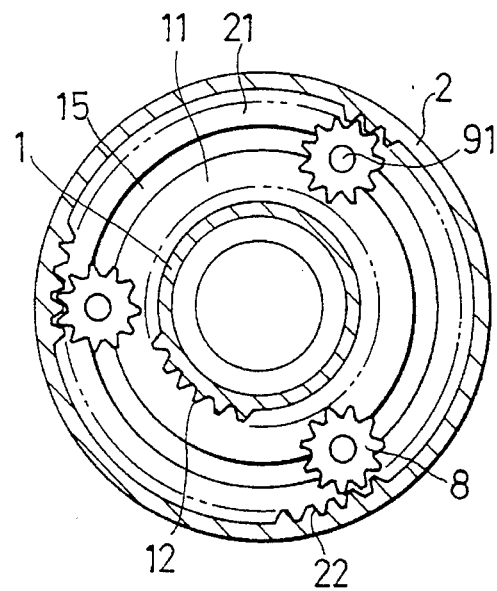
FIG. 4(C) is a bottom view showing a reduction gear mechanism of the brushless electric signal transmitting apparatus shown in FIG. 2.
Figure 5:
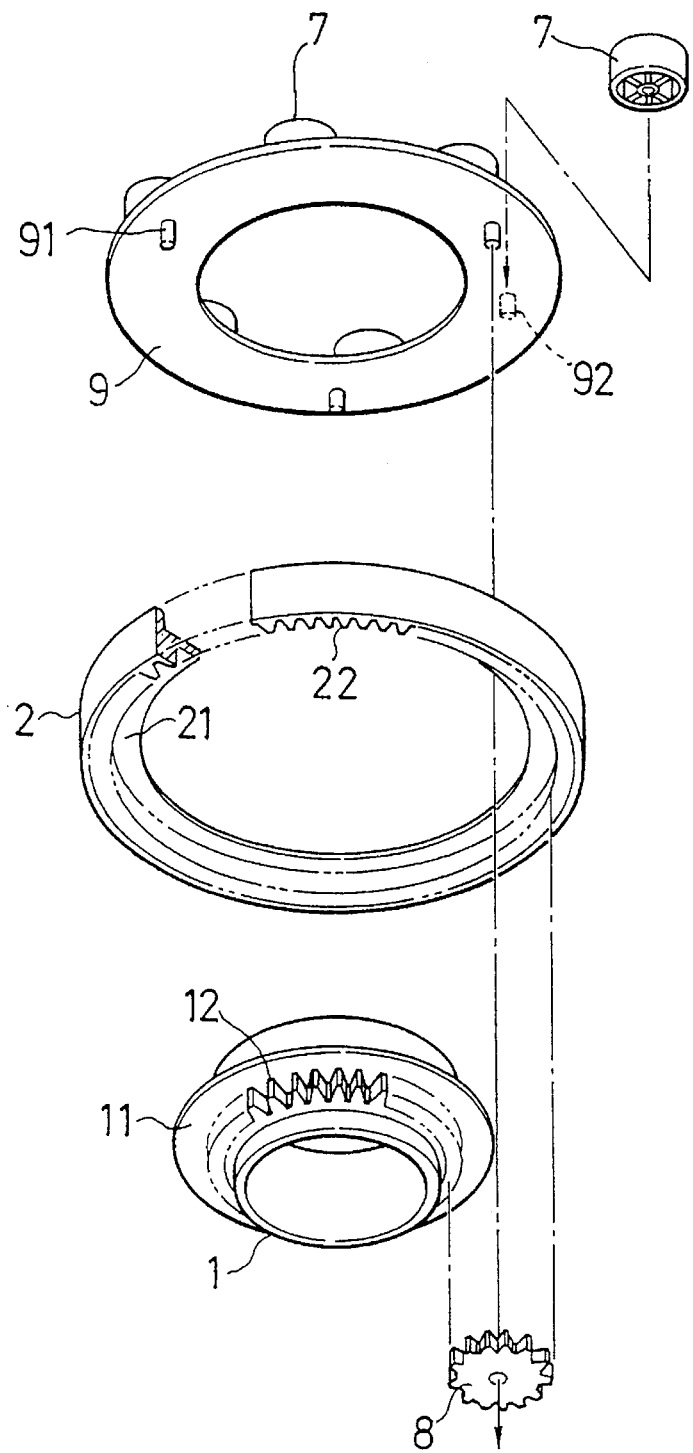
FIG. 5 is an exploded view showing the reduction gear mechanism shown in FIG. 4(C)

FIGS. 4(A) to (C) show the internal mechanism of the brushless electric signal transmitting apparatus 10. That is, FIG. 4(A) (in which the upper and lower covers 3A and 3B are both removed) shows the positions of the six guide rollers 7 arranged in the annular space 4 when seen from above; FIG. 4(B) is a cross-sectional views showing the brushless electric signal transmitting apparatus 10; and FIG. 4(C) shows a reduction gear mechanism when seen from below. Further, FIG. 5 is an exploded view showing the reduction gear mechanism shown in FIG. 4(C).

As shown in FIG. 4(B), the housing 2 fixed to the steering column is formed with an annular flange 21 extending radially inward from the inner circumferential surface thereof near the bottom surface side thereof. On the other hand, the rotary body 1 fixed to the steering handle shaft and positioned within the housing 2 is formed with an annular flange 11 extending radially outward from the outer circumferential surface thereof also near the bottom surface side thereof so as to be opposed to the annular flange 21 with a annular gap 15 between both the annular flanges 21 and 11. Therefore, when the rotary body 1 is assembled with the housing 2, the annular space 4 is formed between the rotary body 1 and the housing 2 and a bottom surface formed by these two annular flanges 11 and 21 having an annular gap 15 therebetween.

In FIG. 4(B), a ring plate 9 is mounted on the two flanges 11 and 21 within the upper annular space 4 formed between the rotary body 1 and the housing 2. Further, as shown in FIG. 5, six upper pins 92 are implanted on the ring plate 9 to rotatably support the six guide rollers 7 on the upper side of the two flanges 11 and 21. On the other hand, three lower pins 91 are implanted on the ring plate 9 on the lower side of the two flanges 11 and 21 in such a way as to be passed through the annular gap 15 formed between the two annular flanges 11 and 21. The three lower pins 91 rotatably support three planetary gears 8 movable along the annular space 15 on the lower side of the two flanges 11 and 21. The three planetary gears 8 are in mesh with both an inner gear 22 formed in an inner circumferential surface of the housing 2 and an outer gear 12 formed in an outer circumferential surface of the rotary body 1. In this embodiment, three planetary gears 8 are arranged at regular angular intervals of the ring plate 9, by way of example. The gear mechanism composed of the planetary gears 8, the inner gear 22 and the outer gear 21 constitute a reduction gear mechanism for the ring plate 9. Therefore, when the rotary body 1 rotates at a higher revolution speed, the ring plate 9 can be rotated at a lower revolution speed.

Further, in this embodiment, the six guide rollers 7 are arranged at regular angular intervals of the ring plate 9, by way of example. In FIG. 4(A), the flat cable 6 is not yet assembled in the annular space 4 formed between the rotary body 1 and the housing 2. Further, a recessed portion 13 is formed in an inner wall of the rotary body 1 to mount an inner cable connector 61 thereat, as shown in FIG. 4(A).

Further, another recessed portion 63 is formed at an outer circumferential wall 64 of the housing 2 to mount an outer cable connector 62 thereat, also as shown in FIG. 4(A).

Now, the cable connector according to the present invention suitable for use with the brushless electric signal transmitting apparatus as described above will be described hereinbelow with reference to FIGS. 6(A) to (D) and FIGS. 7(A) and (B).

FIG. 6(A) shows a first embodiment of the flat cable connector for connecting the flat cable to external wires, in which an inner cable connector 61 for connecting an inner end of the flat cable to the external wires extending to the switches arranged on the steering handle side and an outer cable connector 62 for connecting an outer end of the flat cable to the external wires extending to control circuits arranged on the steering column side are both the same in structure and function. Further, in FIG. 6(A), the cable connector 61 or 62 for connecting the flat cable 6 (having only three cable conductors 6A) with only three external wires 41, 42 and 43 are shown, only by way of example. In practice, however, the number of the cable conductors 6A of the flat cable 6 is more than four.

In the connector 61 or 62 shown in FIG. 6(A), a reverse T-shaped wire mounting plate 30 is formed with three grooves 31, 32 and 33 (external wire holding means) on one (first or reverse) side surface thereof to hold three external wires 41, 42 and 43, respectively. These three grooves 31, 32 and 33 are each formed into roughly an L-shape extending from a top of middle arm of three arms of the reverse T-shaped wire mounting plate 30 to a side end of one horizontal arm (the left side in FIG. 6(A)) of the three arms thereof. The cross section of each of these grooves 31, 32 and 33 is of roughly U-shape with such a depth that the wire 41, 42 or 43 cannot be easily removed out of the groove 31, 32 one 33, after the wire has been once pressure-fit thereinto.

On the other hand, on the other (second or right) side surface of the wire mounting plate 30 (opposite to the surface on which the grooves 31, 32 and 33 are formed), two guide bridges 34 and 35 (flat cable holding means) are formed through which the flat cable 6 is pressure-passed. The inside dimensions of each of the guide bridges 34 and 35 are determined to be slightly smaller than the thickness and the width of the flat cable 6 inserted thereinto in order that the flat cable 6 is not easily removed from the guide bridges 34 and 35 after once having been passed therethrough.

The three external wires 41, 42 and 43 are pressure-fit into the grooves 31, 32 and 33 formed on the reverse side of the wire mounting plate 30 in such a way that the insulating material and the bare wire conductor 41A, 42A or 43A each exposed from the outer end of the insulating material of the external wires 41, 42 and 43 all project slightly from the end surface of the wire mounting plate 30. On the other hand, the flat cable 6 is first inserted into the inside of the bridge 35 formed on the right side of the wire mounting plate 30 and then into the inside of the bridge 34 to such a position that the each bare cable conductor 6A exposed from the outer end of the flat cable 6 projects slightly from the same end surface of the wife mounting plate 30; that is, to such a position that the ends of the bare conductors 6A of the flat cable 6 are arranged side by side with the bare wire conductors 41A, 42A and 43A of the external wires 41, 42 and 43, respectively.

FIG. 6(B) shows the status where the external wires 41, 42 and 43 and the flat cable 6 are all pressure-fit to the wire mounting plate 30. Under these conditions, since the bare conductors 41A, 42A and 43A of the external wires 41, 42 and 43 are arranged side by side with the bare conductors 6A of the flat cable 6, either conductors of the external wires or conductors of the flat cable are bent in such a way that the wire conductors 41A, 42A and 43A of the wires 41, 42 and 43 and the cable conductors 6A of the flat cable 6 are brought into contact with each other. FIG. 6(B) shows the case where the wire conductors 41A, 42A and 43A of the wires 41, 42 and 43 are bent toward the cable conductors 6A of the flat cable 6.

Under these bent conditions, both the conductors 41A, 42A and 43A and 6A of the external wires and the flat cable can be connected to each other by soldering, for instance. In this connection work, it is also preferable to join the external wires 41, 42 and 43 and the flat cable 6 to the wire mounting plate 30 by means of ultrasonic bonding.

FIG. 6(C) shows a modification of the first embodiment of the wire mounting plate 30 shown in FIG. 6(A), in which the wire mounting plate 30 is additionally formed with a plurality of projections 36 on the right side surface thereof, as shown in FIG. 6(C). In this modification, when the flat cable 6 is inserted through the two guide bridges 35 and 34 as shown in FIG. 6(D), since the flat cable 6 can be more firmly held by the wire mounting plate 80 in cooperation with both the guide bridges 34 and 35 and the projections 36, it is possible to improve the mounting reliability of the flat cable 8 to the wire mounting plate 30.

Figure 7A:
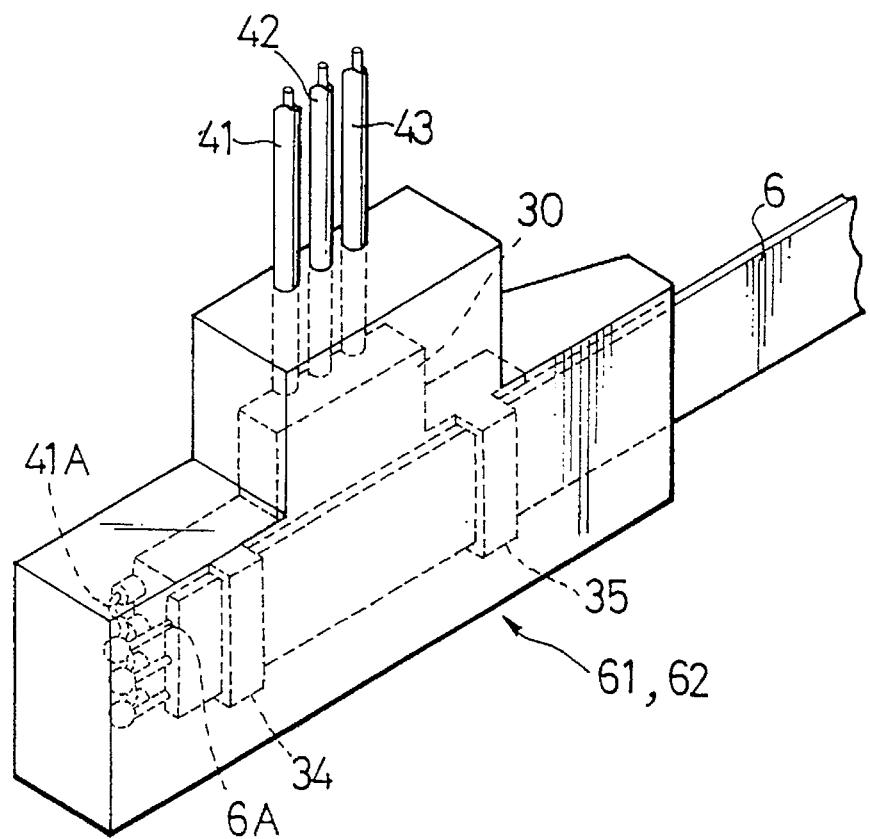
FIG. 7(A) is a perspective view showing a second embodiment of the cable connector according to the present invention.
Figure 7B:
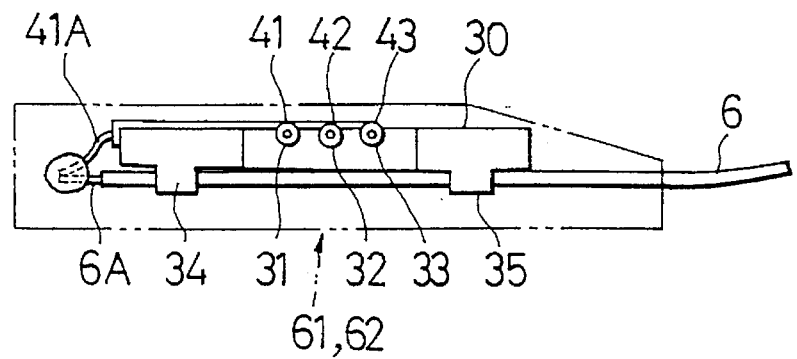
FIG. 7(B) is a side view showing the second embodiment of the cable connector shown in FIG. 7(A).

FIGS. 7(A) and (B) shows a second embodiment of the cable connector 61 or 62 according to the present invention, in which the wire mounting plate 30 to which the external wires 41, 42 and 43 and the flat cable 6 have been all pressure-fit (as shown in FIG. 7(A)) is molded by use of a molding resin, as shown by dot-dot-dashed lines in FIG. 7(B).

Therefore, when the external wires 41, 42 and 43 and the flat cable 6 are all pressure-fit to the wire mounting plate 30 and further molded by resin, it is possible to complete a cable connector 61 or 62 to be mounted to the inner side or outer side of the brushless electric signal transmitting apparatus 10. Further, the completed inner (upper) cable connector 61 is pressure-fit to the recess 13 (shown in FIG. 4(A)) from above and the completed outer (lower) cable connector 62 is pressure-fit a lower recess (not shown) from below.

As described above, in the cable connector for connecting the ends of the flat cable 6 to the external wires 41, 42 and 43 according to the present invention, since the wire mounting plate 30 is formed with U-shaped grooves 31, 32 and 33 on the reverse side surface thereof and with the guide bridges 34 and 35 on the right side surface thereof, it is possible to mount the external wires and the flat cable to the wire mounting plate 30 securely without use of any jig. Further, since the external wires 41, 42 and 43 and the flat cable 6 are all pressure-fit to the grooves 31, 32 and 33 and the guide bridges 35 and 34, even if an external force is applied to the external wires and the flat cable, it is possible to prevent the external force from being directly applied to the wire conductors of the wires and the flat cable. Further, owing to the pressure-fitting of the external wires and the flat cable to the wire mounting plate, it is possible to prevent the wires and the flat cable from being floated from the wire mounting plate 30 when being molded by resin. Further, since molded by resin, it is possible to improve the durability of the wire mounting plate 30 or the flat cable connector under severe ambient conditions and further to protect the flat cable from external force applied thereto.

That is, the effect of the cable connector according to the present invention can be summarized as follows:

(1) The conductors of the external wires and the flat cable can be located and temporarily fixed before soldering, without use of any jig, so that the soldering process can be simplified.

(2) After the external wires and the flat cable have been soldered, even if an external force is applied to the external wires or the flat cable, since the applied external force will not be directly transmitted to the soldered positions, it is possible to protect the flat cable from being broken off or cracked.

(3) The effect as mentioned in item (2) above can be more improved when the wire mounting plate has been molded by resin.

What is claimed is:

1. In a cable connector for connecting respective cable conductors of a flat cable to individual wire conductors of a plurality of external wires, a wire mounting plate comprising:

a substrate having generally planar first and second opposing surfaces, a discrete external wire entry end, a flat cable entry end, and a common end; means for holding the individual external wires on the first surface of said substrate such that the individual external wire conductors project from the common end; and means for holding the flat cable on the second surface of said substrate such that the respective flat cable conductors project from the common end of said substrate such that the wire conductors of the respective external wires lie adjacent to the respective flat cable conductors.

2. The wire mounting plate of claim 1, wherein said external wire holding means comprise a plurality of U-shaped grooves formed in the first surface of said wire mounting plate, each groove being adapted to receive a respective external wire with a pressure-fit.

3. The wire mounting plate of claim 1, wherein said flat cable holding means comprises at least two square-shaped guide bridges spaced from each other and from the second surface of said wire mounting plate, wherein each bridge is adapted to receive the flat cable.

4. The wire mounting plate of claim 1, wherein each of the wire conductors of the external wires are soldered to respective flat cable conductors near the common end.

5. The wire mounting plate of claim 1, wherein said wire mounting plate is of a T-shape.

6. The wire mounting plate of claim 2, wherein the grooves extend from the discrete wire entry end to the common end and traverse a right angle on the first surface.

7. The wire mounting plate of claim 3, wherein said flat cable holding means further comprises at least one flat cable engaging projection formed on the second surface, each projection being adapted to hold the flat cable more tightly in cooperation with one of the guide bridges.

8. The wire mounting plate of claim 2, wherein each of the external wire conductors and each of the flat cable conductors extend at their respective first ends from the common end of the substrate on opposite surfaces of the substrate, and further comprising the grooves in combination with bridges to form means for positioning the respective external wire conductor first ends and the respective flat cable conductor first ends closely adjacent one another.

9. A cable connector assembly, comprising:

a) a flat cable having a first end portion and a second end extending away from the first end, comprising a plurality of conductors each including an insulation overcoating and being joined at adjacent surfaces of the insulation;

b) a plurality of individual wires forming a bundle, each wire having a first end portion and a second end extending away from the first end, and further including an individual conductor and an insulation overcoating;

c) a wire mounting plate, comprising:
  i) a substrate having generally planar first and second opposing surfaces, an individual wire bundle entry end, a flat cable entry end, and a common end;
  ii) means for holding the individual wires on the first surface of said substrate such that the individual conductors project from the common end; and
  iii) means for holding the flat cable on the second surface of said substrate such that the respective flat cable conductors project from the common end of said substrate such that the individual wire conductors of the respective wire bundle lie adjacent to the respective flat cable conductors.

10. The cable connector assembly of claim 9, wherein said wire holding means comprise a plurality of U-shaped grooves formed in the first surface of said wire mounting plate, each groove being adapted to receive a respective individual wire with a pressure-fit.

11. The cable connector assembly of claim 9, wherein the flat cable holding means comprises at least two square-shaped guide bridges spaced from each other and from the second surface of said wire mounting plate, wherein each bridge is adapted to receive the flat cable.

12. The cable connector assembly of claim 9, wherein each of the individual wire conductors of the wire bundle are soldered to respective flat cable conductors near the common end.

13. The cable connector assembly of claim 9, wherein the wire mounting plate is of a T-shape.

14. The cable connector assembly of claim 9, wherein the assembly is substantially embedded in an insulating resin.

15. The cable connector assembly of claim 10, wherein the grooves extend from the wire bundle entry end to the common end and traverse a right angle on the first surface.

16. The cable connector assembly of claim 11, wherein said flat cable holding means further comprises at least one flat cable engaging projection formed on the second surface, each projection being adapted to hold the flat cable more tightly in cooperation with one of the guide bridges.

17. The wire mounting plate of claim 10, wherein each of the individual wire bundle conductors and each of the flat cable conductors extend at their respective first ends from the common end of the substrate on opposite surfaces of the substrate, and further comprising the grooves in combination with bridges to form means for positioning the respective individual wire bundle conductor first ends and the respective flat cable conductor first ends closely adjacent one another.

18. A method of forming a cable connector assembly, comprising the steps of:

a) providing a flat cable having a first end portion and a second end extending away from the first end, comprising a plurality of conductors each including an insulation overcoating and being joined at adjacent surfaces of the insulation;

b) removing a portion of the insulation from the first end of at least one of the flat cable conductors;

c) providing a plurality of individual wires forming a bundle, each wire having a first end portion and a second end extending away from the first end, and further including an individual conductor and an insulation overcoating;

d) removing a portion of the insulation from the first end of at least one individual conductor of the wire bundle;

e) providing a wire mounting plate, comprising:
   i) a substrate having generally planar first and second opposing surfaces, an individual wire bundle entry end, a flat cable entry end, and a common end;
   ii) means for holding the individual wires on the first surface of said substrate such that the individual conductors project from the common end; and
   iii) means for holding the flat cable on the second surface of said substrate such that the respective flat cable conductors project from the common end of said substrate such that the individual wire conductors of the respective wire bundle lie adjacent to the respective flat cable conductors;

f) securing the individual wires of the wire bundle on the first surface;

g) securing the flat cable on the second surface; and h) joining respective flat cable conductors to the individual wires.

19. The method of claim 18, wherein the step of joining the respective flat cable conductors to the individual wires is performed by soldering.

20. The method of claim 18, further including the step of substantially embedding the assembly in an insulating resin.

* * * * *